United States Patent
Morath et al.

(10) Patent No.: US 11,313,275 B2
(45) Date of Patent: Apr. 26, 2022

(54) NOZZLE RING FOR A TURBOCHARGER

(71) Applicant: ABB Schweiz AG, Baden (CH)

(72) Inventors: Christoph Morath, Höchenschwand (DE); Tobias Gwehenberger, Rheinfelden (CH)

(73) Assignee: ABB SCHWEIZ AG, Baden (CH)

( * ) Notice: Subject to any disclaimer, the term of this patent is extended or adjusted under 35 U.S.C. 154(b) by 161 days.

(21) Appl. No.: 16/604,833

(22) PCT Filed: Apr. 12, 2018

(86) PCT No.: PCT/EP2018/059439
§ 371 (c)(1),
(2) Date: Oct. 11, 2019

(87) PCT Pub. No.: WO2018/189319
PCT Pub. Date: Oct. 18, 2018

(65) Prior Publication Data
US 2020/0392895 A1   Dec. 17, 2020

(30) Foreign Application Priority Data
Apr. 13, 2017 (DE) .......................... 102017108057.0

(51) Int. Cl.
*F02C 6/12* (2006.01)
*F01D 17/16* (2006.01)
(Continued)

(52) U.S. Cl.
CPC .............. *F02C 6/12* (2013.01); *F01D 17/165* (2013.01); *F01D 25/16* (2013.01); *F01D 25/246* (2013.01);
(Continued)

(58) Field of Classification Search
CPC ...... F01D 17/165; F01D 25/16; F01D 25/246; F01D 5/046; F02C 6/12; F05D 2220/40; F05D 2240/15; F05D 2260/38
See application file for complete search history.

(56) References Cited

U.S. PATENT DOCUMENTS 4,969,805 A * 11/1990 Romeo .................. F01D 25/24
417/360
5,372,485 A * 12/1994 Sumser .................. F01D 17/14
415/166
(Continued)

FOREIGN PATENT DOCUMENTS

DE        4238550 A1    5/1994
DE       10048105 A1    4/2002
(Continued)

OTHER PUBLICATIONS

Examination Report for DE 10 2017 108 058.0, dated Jan. 12, 2018, 15 pages, English language translation attached.
(Continued)

*Primary Examiner* — Jesse S Bogue
(74) *Attorney, Agent, or Firm* — Armstrong Teasdale LLP (57) ABSTRACT

The invention relates to a nozzle ring (10) for a radial turbine. The nozzle ring comprises a rotationally symmetrical, disk-shaped main body (11) with a central opening (12) for the leadthrough of a shaft (20). Furthermore, the nozzle ring comprises guide blades (14) which are arranged in a circumferential direction in a radially outer region of the main body (11) and which are designed to direct exhaust gases onto rotor blades (31) of a turbine wheel (30). The main body (11) of the nozzle ring is designed to, in the installed state, form a heat shield between a bearing space (40) of a bearing housing (41) and a turbine space (50).

17 Claims, 6 Drawing Sheets

(51) Int. Cl.
*F01D 25/16* (2006.01)
*F01D 25/24* (2006.01)
(52) U.S. Cl.
CPC ...... *F05D 2220/40* (2013.01); *F05D 2240/15* (2013.01); *F05D 2260/38* (2013.01)

(56) References Cited

U.S. PATENT DOCUMENTS

| | | | | |
|---|---|---|---|---|
| 5,441,383 | A * | 8/1995 | Dale | F01D 17/143 415/150 |
| 5,454,225 | A * | 10/1995 | Sumser | F01D 9/045 60/602 |
| 5,758,500 | A * | 6/1998 | Sumser | F02B 37/025 60/602 |
| 6,220,031 | B1 * | 4/2001 | Daudel | F01D 1/023 415/157 |
| 7,021,057 | B2 * | 4/2006 | Sumser | F02C 6/12 60/602 |
| 7,384,236 | B2 * | 6/2008 | Meier | F01D 25/08 415/178 |
| 7,631,497 | B2 * | 12/2009 | Panek | F01D 25/186 60/605.1 |
| 8,608,433 | B2 * | 12/2013 | Lombard | F01D 5/048 415/157 |
| 9,909,456 | B2 * | 3/2018 | Richner | F01D 9/042 |
| 2003/0194333 | A1 * | 10/2003 | Sumser | F02B 37/025 417/407 |
| 2004/0025504 | A1 * | 2/2004 | Perrin | F04D 25/04 60/602 |
| 2004/0244372 | A1 | 12/2004 | Leavesley | |
| 2006/0037317 | A1 | 2/2006 | Leavesley | |
| 2015/0044037 | A1 * | 2/2015 | Bucking | F02B 39/14 415/177 |
| 2016/0245160 | A1 | 8/2016 | Ueda et al. | |
| 2016/0265388 | A1 | 9/2016 | Annati et al. | |

FOREIGN PATENT DOCUMENTS

| | | |
|---|---|---|
| DE | 10297203 T5 | 8/2004 |
| DE | 102016002701 A1 | 9/2016 |
| EP | 0802305 A1 | 10/1997 |
| EP | 2455590 A1 | 5/2012 |
| EP | 2778349 A1 | 9/2014 |
| GB | 2271814 A | 4/1994 |
| JP | 2003227344 A | 8/2003 |
| JP | 2012107527 A | 6/2012 |
| WO | 2009071868 A1 | 6/2009 |

OTHER PUBLICATIONS

Written Opinion of the International Searching Authority for PCT/EP2018/059439, dated Oct. 18, 2018, 14 pages, English language translation attached.

European Patent Office, International Search Report for PCT/EP2018/059439, dated Jun. 26, 2018, 6 pages (including English translation).

Office Action issued in Japanese Application No. 2019-555775, dated Nov. 29, 2021, with English translation, 7 pages.

* cited by examiner

NOZZLE RING FOR A TURBOCHARGER

CROSS-REFERENCE TO RELATED APPLICATIONS

This application is a national stage entry under 35 U.S.C. § 371 of PCT International Stage Patent Application No. PCT/EP2018/059439, filed Apr. 12, 2018, which claims priority to German Patent Application No. 10 2017 108 057.0, filed Apr. 13, 2017. The entire disclosures of the foregoing applications are incorporated herein by reference.

TECHNICAL FIELD

The invention relates to the field of exhaust-gas turbochargers for supercharged internal combustion engines. In particular, the invention relates to a nozzle ring of an exhaust-gas turbocharger of said type.

TECHNICAL BACKGROUND

For the purposes of increasing performance of an internal combustion engine, it is nowadays standard to use exhaust-gas turbochargers, having a turbine in the exhaust tract of the internal combustion engine and having a compressor positioned upstream of the internal combustion engine. Here, the exhaust gases of the internal combustion engine are expanded in the turbine. The work thus obtained is transmitted by means of a shaft to the compressor, which compresses the air fed to the internal combustion engine. Through the use of the energy of the exhaust gases for compressing the air fed to the combustion process in the internal combustion engine, it is possible for the combustion process and the efficiency of the internal combustion engine to be optimized.

The kinetic energy of the exhaust gas is used to drive the rotor of the turbocharger. To be able to ensure reliable operation, the exhaust-gas jet must be conducted onto the turbine shaft in a directed manner. For this purpose, and in order to permit "matching" of the turbocharger for different applications, in the case of radial turbine stages, a nozzle ring is installed at the outlet of the flow channel upstream of the turbine shaft.

Depending on the turbine used, and in accordance with the specific usage conditions, the working medium, for example the exhaust gases, may exhibit a large temperature gradient. Therefore, nozzle rings of exhaust-gas turbochargers are typically subjected to high loading owing to fluctuating operating conditions, that is to say increases or decreases in pressure and temperature of the working medium, and may be subject to relatively intense temperature expansions.

The fastening of nozzle rings is commonly performed by way of simple clamping in the housing of the exhaust-gas turbine. For example, the nozzle ring may be held in position by being axially clamped, generally between turbine housing and bearing housing. Furthermore, if appropriate, a separate heat shield may be installed, if the introduction of heat by the exhaust gas into the bearing housing is excessively high or if too much energy is extracted from the exhaust gas by introduction of heat into adjacent components. In some cases, it is also necessary for the nozzle ring to be aligned relative to the position of the turbine housing; this is then realized by means of positioning components such as for example slot nuts or pinned connections.

PRESENTATION OF THE TECHNICAL PROBLEM

It has been found that, owing to the demand to be able to use/install turbine shaft/turbine stages of different size, the turbine heads of which differ greatly in terms of size and also have different turbine rear wall geometries, in one rotor block, a new nozzle ring concept is required.

In particular, the fastening and mounting concepts of nozzle rings known from the prior art, in particular by means of axial clamping between turbine housing, bearing housing and a heat shield, have disadvantages insofar as the positioning of the nozzle ring blades and the introduction of different turbine rear wall geometries are not independent of the clamping connection that is used.

It is therefore an object of the present invention to provide an improved nozzle ring which at least partially, or substantially or even completely, overcomes the disadvantages known from the prior art.

SUMMARY OF THE INVENTION

To achieve the above-stated object, a nozzle ring for a radial turbine as per independent claim 1 is provided. Further aspects, advantages and features of the present invention emerge from the dependent patent claims, from the description and from the appended figures.

According to one aspect of the invention, a nozzle ring for a radial turbine is provided. The nozzle ring comprises a rotationally symmetrical, disk-shaped main body with a central opening for the leadthrough of a shaft. Furthermore, the nozzle ring comprises guide blades which are arranged in a circumferential direction in a radially outer region of the main body and which are designed to direct exhaust gases onto rotor blades of a turbine wheel. The main body of the nozzle ring is designed to, in the installed state, form a heat shield between a bearing space of a bearing housing and a turbine space.

It is thus advantageously the case that a nozzle ring is provided which permits a fastening and mounting concept with which the positioning of the nozzle ring blades and the introduction of different turbine rear wall geometries are independent of the clamping connection used and/or of an existing hot centering means/seal.

Furthermore, a nozzle ring with integrated heat shield is advantageously provided, such that the number of interfaces/joints is reduced. Furthermore, a freeing-up/derestriction of the rear wall geometry of the turbine shaft is made possible, because this is integrated in the nozzle ring, such that no different bearing housing variants are necessary. Furthermore, a nozzle ring is provided whose fixing can advantageously be realized outside the clamping connection "bearing housing/turbine housing", for example by fastening by means of temperature-resistant screws to the bearing housing.

Furthermore, the nozzle ring described herein permits an improved connection, in particular with regard to deformation (under temperature influence) and gas-tightness, because the nozzle ring can advantageously be preloaded axially against the bearing housing slightly in the manner of a plate spring. Thus, through the use of the nozzle ring described herein, an additional "containment" interface can advantageously be avoided. Furthermore, through the use of the nozzle ring described herein, it is advantageously possible to avoid an additional interface that influences the gas-tightness with respect to the surroundings.

Furthermore, it is pointed out that, with the use of the nozzle ring described herein, the scaling of the turbine head does not influence the clamping connection/the hot centering means. The maximum scaling is defined by dimensioning of the bearing housing.

Furthermore, the nozzle ring described herein can advantageously be fastened to the bearing housing in a central region around the turbine shaft, such that a thermal expansion of the nozzle ring is advantageously influenced little by a fastening situated relatively far to the inside. A further advantage of the nozzle ring described herein consists in that the fastening elements for the nozzle ring are not situated in the region of the main flow.

According to a further aspect of the invention, an exhaust-gas turbocharger having a nozzle ring according to any of the embodiments described herein is provided, such that an improved exhaust-gas turbocharger can advantageously be provided.

The exhaust-gas turbocharger comprises a turbine housing, a shaft mounted in a bearing housing, on which shaft a turbine wheel with rotor blades is arranged. Furthermore, the exhaust-gas turbocharger comprises an inflow channel for exhaust gases, which inflow channel is formed in the turbine housing upstream of the turbine wheel. Furthermore, the exhaust-gas turbocharger comprises a nozzle ring according to any of the embodiments described herein, wherein the nozzle ring is designed such that the nozzle ring, in the installed state, is held axially between the bearing housing and the turbine housing of a turbocharger.

BRIEF DESCRIPTION OF THE FIGURES

The invention will be discussed below on the basis of exemplary embodiments illustrated in figures, from which further advantages and modifications emerge. In the figures.

DETAILED DESCRIPTION OF THE FIGURES

Figure 1:
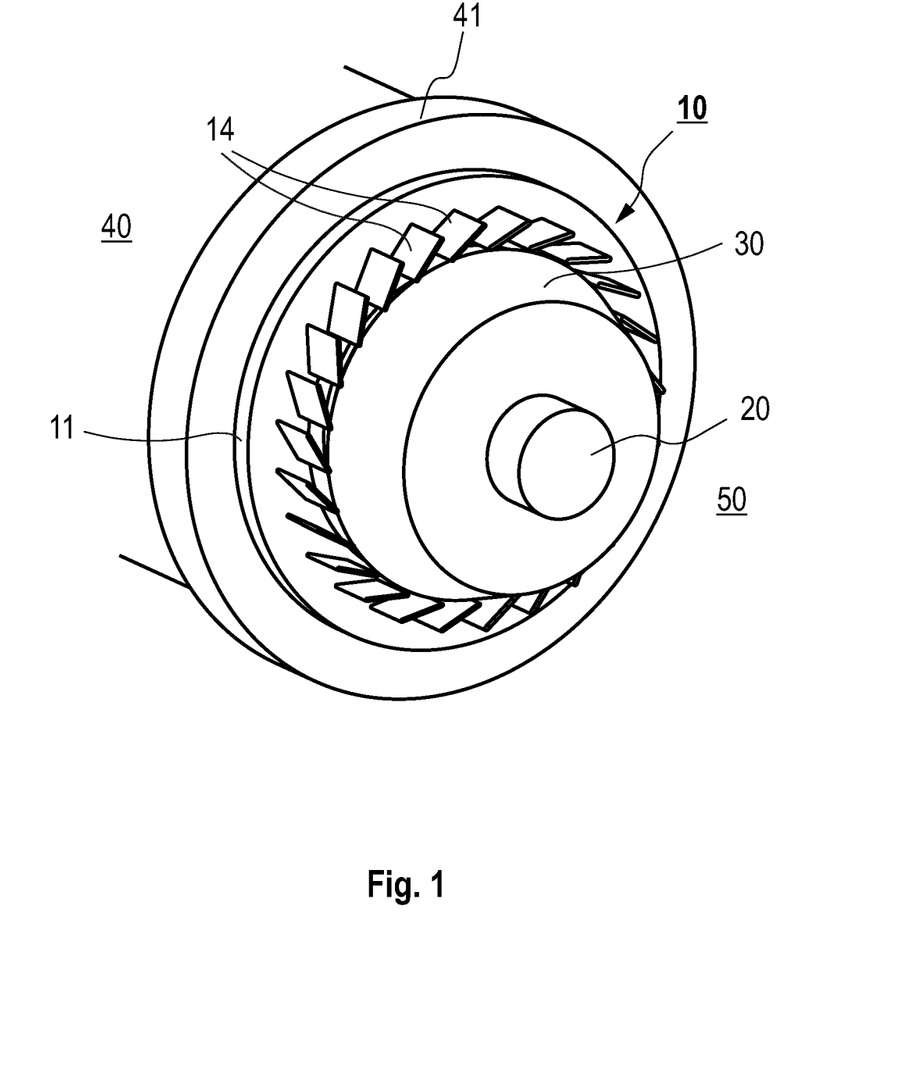
FIG. 1 shows a schematic isometric view of a nozzle ring according to embodiments described herein in an installed state with a turbine wheel.
Figure 2:
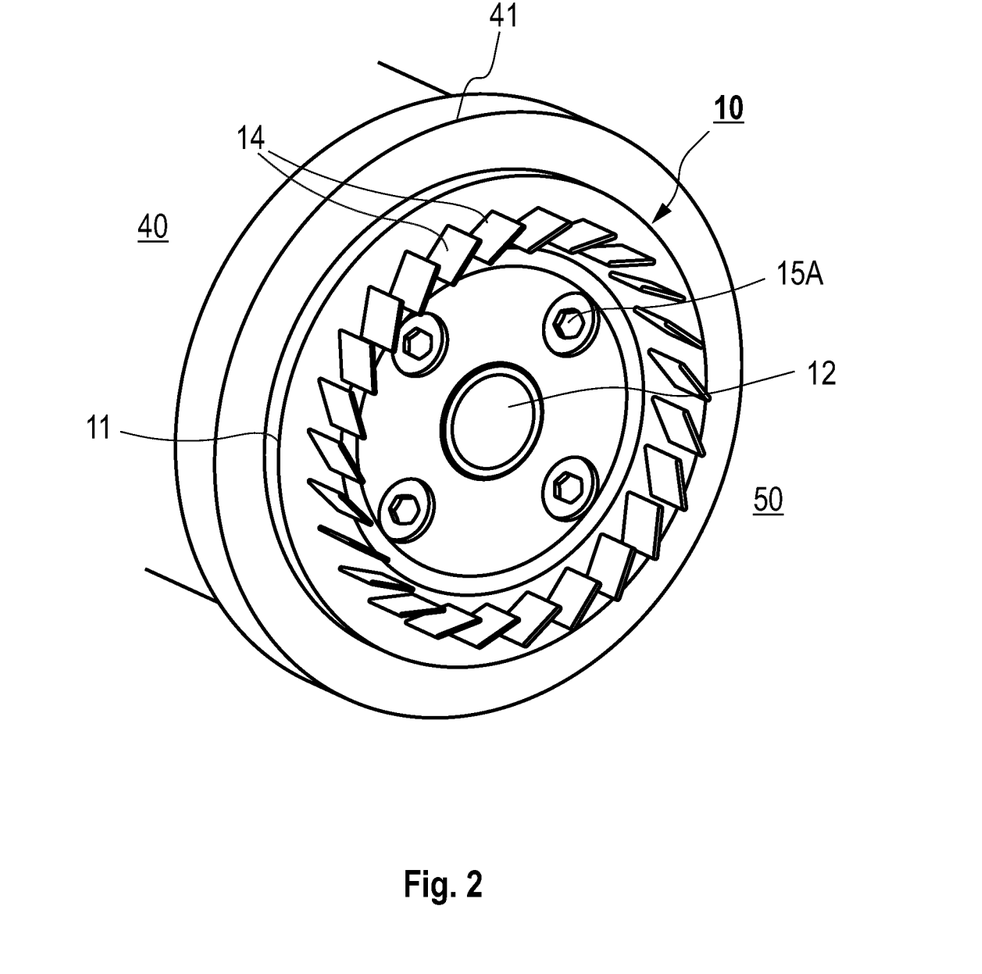
FIG. 2 shows a schematic isometric view of a nozzle ring according to embodiments described herein in an installed state without a turbine wheel.

FIG. 1 shows a schematic isometric view of a nozzle ring 10 according to embodiments described herein in an installed state. The turbine wheel 30 of a radial turbine is schematically illustrated.

According to embodiments described herein of the nozzle ring, the nozzle ring 10 comprises a rotationally symmetrical, disk-shaped main body 11 with a central opening 12 for the leadthrough of a shaft 20. As shown by way of example in FIG. 1, the nozzle ring 10 typically comprises guide blades 14, which are arranged in a circumferential direction in a radially outer region of the main body 11. The guide blades 14 are typically arranged and designed to direct exhaust gases onto rotor blades of a turbine wheel 30. In particular, the guide blades 14 may extend in an axial direction from the main body 11 and be formed integrally with the main body. As can be seen from FIG. 1, the main body 11 of the nozzle ring described herein is designed to, in the installed state, form a heat shield between a bearing space 40 of a bearing housing 41 and a turbine space 50. Typically, the main body 11 of the nozzle ring extends radially outward from the central opening 12, as illustrated by way of example in FIGS. 3 to 5. In particular, the main body of the nozzle ring is designed such that (aside from the bores 17) a closed surface is provided between the central opening 12 and the outer edge of the main body.

Thus, a nozzle ring with integrated heat shield is advantageously provided, such that the number of interfaces/joints in the region of the installed nozzle ring is reduced. Furthermore, by means of the design of the main body of the nozzle ring extending radially outward from the central opening, a freeing-up/derestriction of the rear wall geometry of the turbine shaft is made possible, because this can be integrated in the nozzle ring. Different bearing housing variants are therefore not necessary.

Furthermore, a nozzle ring is provided whose fixing can advantageously be realized outside the clamping connection "bearing housing/turbine housing", for example by fastening by means of temperature-resistant screws to the bearing housing, as described below.

Figure 4:
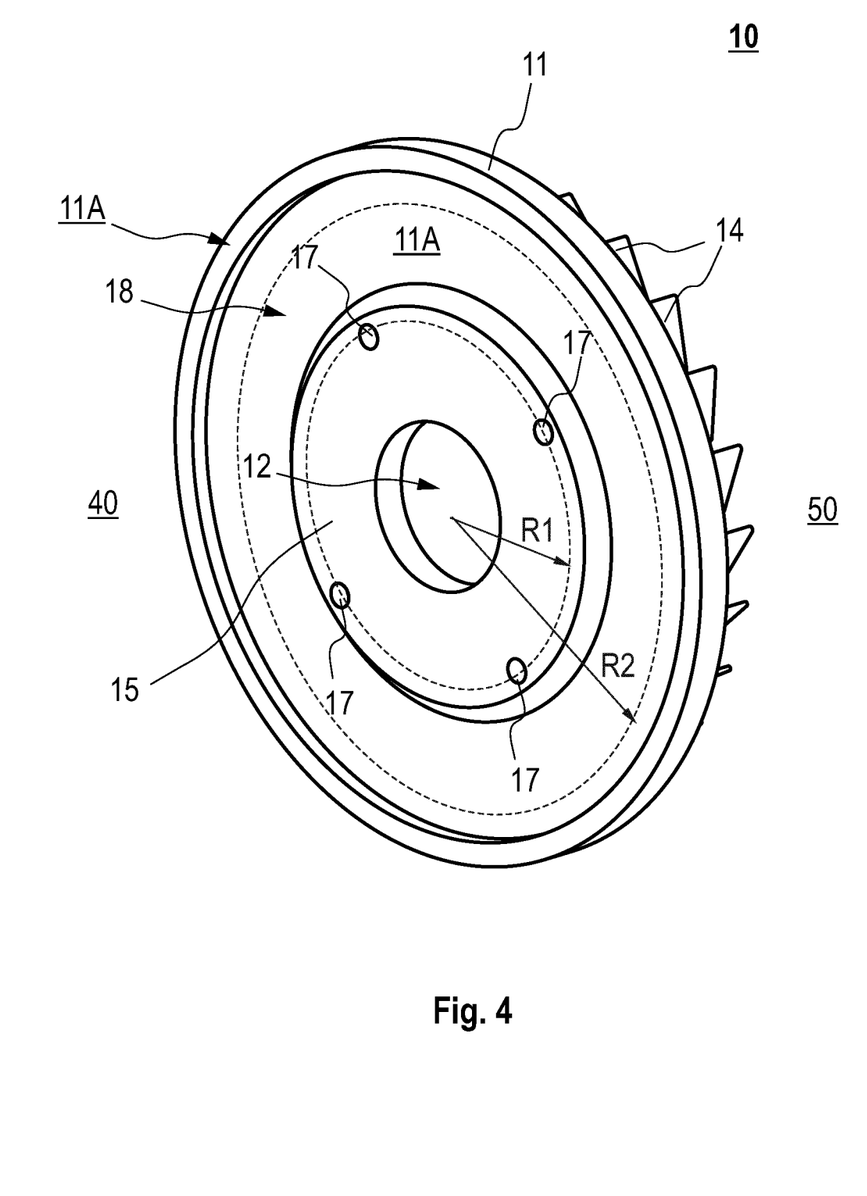
FIG. 4 shows a schematic isometric view of a bearing housing side of a nozzle ring with a recess according to further embodiments described herein.
Figure 5:
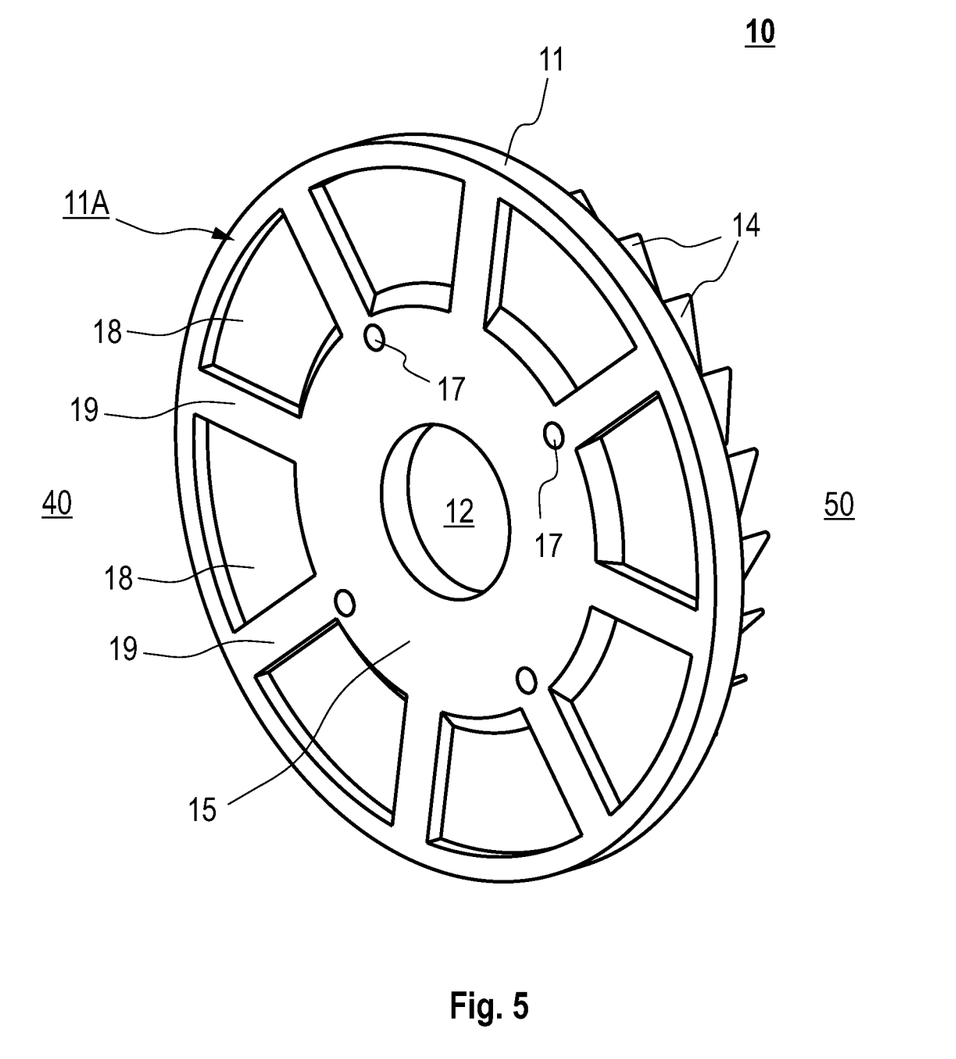
FIG. 5 shows a schematic isometric view of a bearing housing side of a nozzle ring comprising a recess with ribs extending in a radial direction, according to further embodiments described herein.
Figure 6:
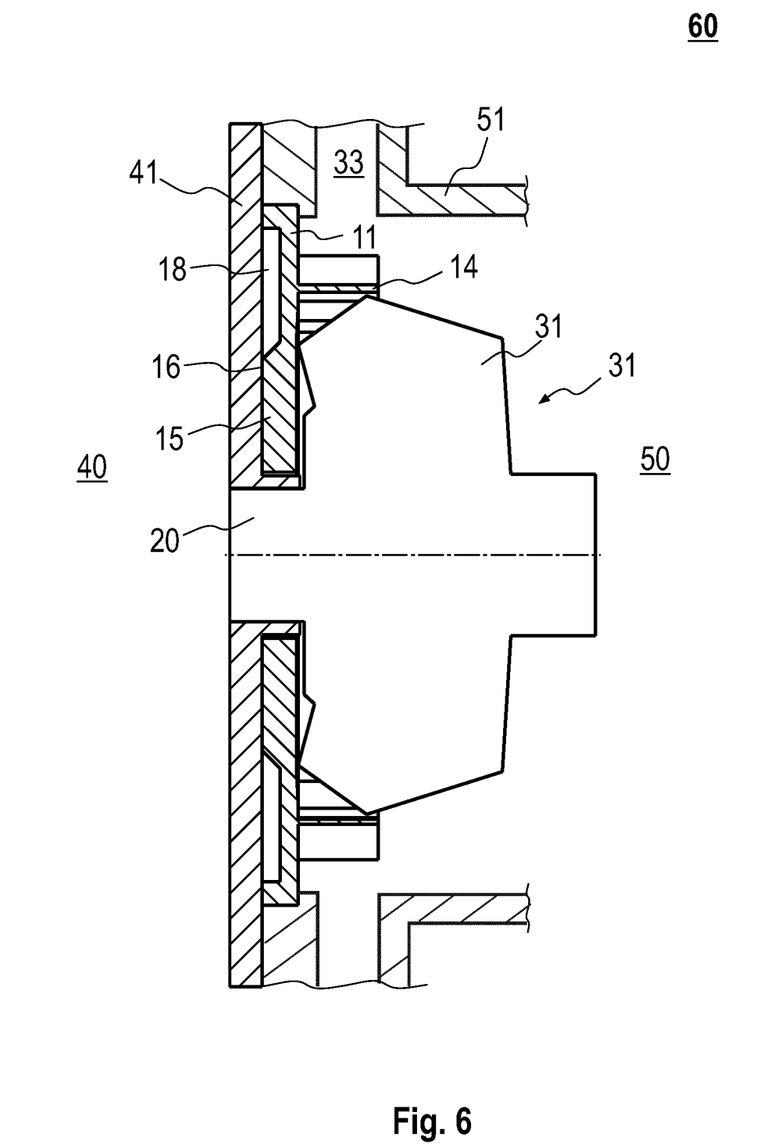
FIG. 6 shows a schematic sectional view of a detail of an exhaust-gas turbocharger according to embodiments described herein.

In an embodiment that may be combined with other embodiments described herein, the nozzle ring may comprise a fastening flange 15 as shown by way of example in FIGS. 4, 5 and 6. In particular, the fastening flange 15 is typically arranged in a radially inner region of the main body 11. Furthermore, the fastening flange 15 may have a contact surface 16 for support on a corresponding contact surface of the bearing housing 41, as shown by way of example in FIG. 6.

Figure 3:
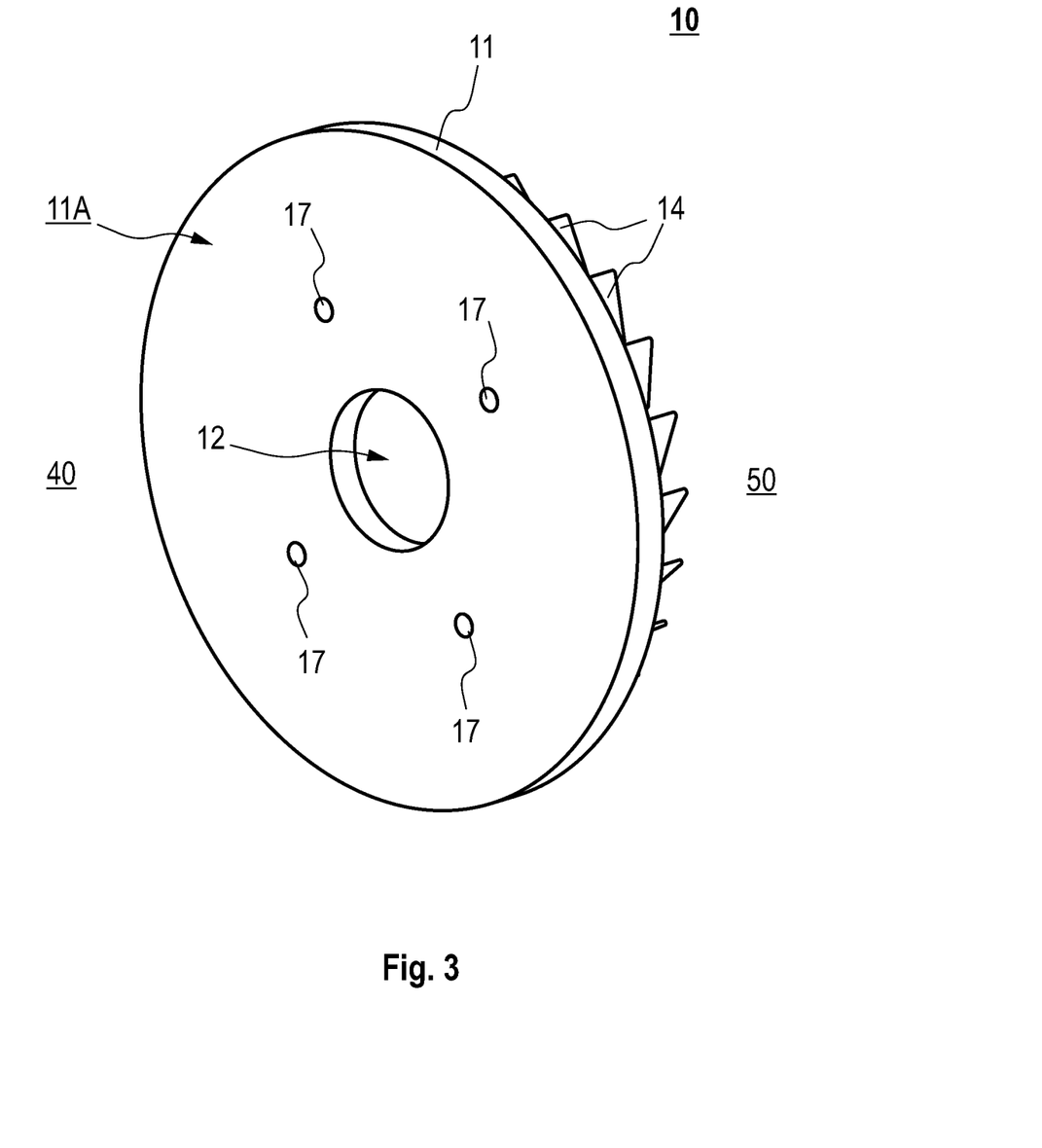
FIG. 3 shows a schematic isometric view of a bearing housing side of a nozzle ring according to embodiments described herein.

As shown by way of example in FIGS. 3, 4 and 5, the nozzle ring 10, in particular the main body of the nozzle ring, may, as per embodiments described herein, comprise one or more bores 17 arranged in a circumferential direction, which bores are suitable for receiving one or more fastening means in order to install the nozzle ring on the bearing housing. For example, the fastening means may be pins, bolts, screws or the like. The fastening means are typically heat-resistant.

Accordingly, the nozzle ring described herein can advantageously be fastened to the bearing housing in a central region around the turbine shaft, such that a thermal expansion of the nozzle ring is advantageously influenced little by a fastening situated relatively far to the inside. Furthermore, the fastening of the nozzle ring described herein has the advantage that the fastening elements for the nozzle ring are not situated in the region of the main flow.

In an embodiment that may be combined with other embodiments described herein, the fastening flange 15 is an integral constituent part of the main body 11. This advantageously leads to a reduction in components.

Furthermore, the nozzle ring may, alternatively or additionally to a central fastening (for example by means of a fastening flange described herein and corresponding fastening means), be designed such that the nozzle ring, in the installed state, under the action of temperature, becomes clamped axially between bearing housing 40 and turbine housing and/or radially in the bearing housing 40 and/or radially in the turbine housing.

It is thus possible to provide an improved connection of the nozzle ring in the installed state to the corresponding contact surfaces, in particular with regard to deformation (under temperature influence) and gas-tightness, because the nozzle ring can advantageously be preloaded axially against the bearing housing slightly in the manner of a plate spring. Thus, through the use of the nozzle ring described herein, it is advantageously possible to avoid an additional "containment" interface and also an additional interface that would influence the gas-tightness with respect to the surroundings.

In an embodiment that may be combined with other embodiments described herein, a bearing housing side 11A of the main body 11 may comprise one or more recesses 18, as illustrated for example in FIG. 4. In particular, the recess 18 is typically designed to, in the installed state of the nozzle ring, form one or more air-filled insulation spaces. A nozzle ring with integrated heat shield can thus be provided in a simple and effective manner.

Furthermore, the recess 18 may comprise ribs 19 which extend in a radial direction, as illustrated by way of example in FIG. 5. Such ribs can have an advantageous effect on the stability and on the thermal expansion characteristics of the nozzle ring.

In an embodiment that may be combined with other embodiments described herein, the bores 17 may be arranged in the fastening flange on a first virtual circular line with a first radius R1 around the central opening 12. Furthermore, the guide blades 14 may be arranged on a second virtual circular line with a second radius R2 around the central opening 12. Typically, the second radius R2 is greater than the first radius R1; for example, the second radius may be R2≥1.5×R1.

The bores 17 for receiving one or more fastening means in the fastening flange may be arranged at regular or irregular angular intervals around the central opening 12. A regular arrangement may for example have the advantage of improved non-positive locking fastening of the nozzle ring to the bearing housing.

It is also pointed out that the nozzle ring described herein may also be a closed nozzle ring. For example, the nozzle ring may have, on a side situated opposite the main body 11, a further arranged disk that is connected to the guide blades 14. In particular, the further arranged disk may be configured to provide a further heat shield.

In an embodiment that may be combined with other embodiments described herein, a radially outer region of the main body may have one or more centering cams (not illustrated) which are arranged so as to be distributed along the circumference of the main body. Such centering cams may for example engage into corresponding grooves in the turbine housing, whereby radial guidance of the turbine housing with respect to the main body of the nozzle ring is realized. For example, the main body, correspondingly aligned owing to the centering cams, of the nozzle ring can be slid in an axial direction into the turbine housing. In the operational state, the main body of the nozzle ring expands in a radial direction, and the outer edge of the main body of the nozzle ring is pressed against a corresponding support of the turbine housing, whereby centering of the turbine housing relative to the bearing housing is made possible.

As emerges from the embodiments described herein, a nozzle ring is provided by the embodiments described herein which can advantageously be used for an exhaust-gas turbocharger, such that the positioning of the nozzle ring blades and the introduction of different turbine rear wall geometries are independent of the clamping connection used and/or of an existing hot centering means/seal.

As described herein, the heat shield may be geometrically integrated into an open nozzle ring as an elongation of the bearing-housing-side nozzle ring plate. Said nozzle ring plate (also referred to herein as main body) is in this case designed in terms of dimensions such that the rear space of the turbine head is covered as far as the transition of the shaft hub. The integration of different turbine rear walls is thus possible, and only one specification part is required. The nozzle ring blades are formed integrally with the nozzle ring plate and may be produced for example by cutting or by means of precision casting.

As described herein, the nozzle ring may be fastened by fastening means, for example screws, behind the turbine head (turbine head rear space) over a relatively small diameter. Thus, the nozzle ring is situated outside the clamping connection of turbine housing/bearing housing, and the fastening means are situated in a region which is not critical for the scaling of the turbine head/of the nozzle ring blades. By removing the nozzle ring from the clamping connection, a positive effect is also achieved with regard to the containment and the gas-tightness, because the number of interfaces in the clamping connection is reduced.

By means of this type of installation, it is also possible for the nozzle ring to be installed in a slightly preloaded manner if necessary (principle of a plate spring). With this measure, a thermal deformation can be counteracted. This also possibly assists the prevention of an "internal gas bypass" behind the nozzle ring.

FIG. 6 illustrates a schematic sectional view of a detail of an exhaust-gas turbocharger 60 according to embodiments described herein. Typically, the exhaust-gas turbocharger 60 comprises a turbine housing 51, a shaft 20 mounted in a bearing housing 41. A turbine wheel 30 with rotor blades 31 is arranged on the shaft 20. Furthermore, the exhaust-gas turbocharger typically has an inflow channel 33 for exhaust gases, which inflow channel is formed in the turbine housing 51 upstream of the turbine wheel 30. Furthermore, the exhaust-gas turbocharger has a nozzle ring 10 according to any of the embodiments described herein, as schematically illustrated in FIG. 6. In particular, the nozzle ring 10 is designed such that the nozzle ring, in the installed state, is held axially between the bearing housing 41 and the turbine housing of a turbocharger.

For example, the nozzle ring may be fastened by way of a fastening flange 15 to the bearing housing 41 by heat-resistant fastening means 15A. In particular, the heat-resistant fastening means 15A may be heat-resistant screws, by means of which and the nozzle ring 10 is screwed to the bearing housing 41.

As an alternative or additional possibility for the installation of the nozzle ring in the exhaust-gas turbocharger, the nozzle ring 10 and the bearing housing 41 may be designed such that the nozzle ring, in the installed state, is axially braced in the manner of a plate spring between bearing housing and turbine housing.

Furthermore, the nozzle ring 10 and the bearing housing 41 may, as an alternative or additional possibility for the installation of the nozzle ring in the exhaust-gas turbocharger, be designed such that the nozzle ring 10, in the installed state, under the action of temperature, that is to say heat, becomes clamped axially between bearing housing 41 and turbine housing and/or radially in the bearing housing 41 and/or in the turbine housing 51.

Furthermore, one or more rotation prevention means for the nozzle ring may be provided. For example, the nozzle ring 10 and the bearing housing 41 may be designed such that, for the nozzle ring, in the installed state, one or more rotation prevention means is or are provided. The one or more rotation prevention means may for example be formed by means of positive locking/non-positive locking connections between nozzle ring and bearing housing. Alternatively or in addition, one or more rotation prevention means may be formed, for example by means of positive locking/non-positive locking connections, between nozzle ring and turbine housing. This may be advantageous in particular if the nozzle ring is not fastened to the bearing housing but rather axially braced in the manner of a plate spring between bearing housing and turbine housing.

LIST OF REFERENCE DESIGNATIONS

10 Nozzle ring
11 Main body
11A Bearing housing side of the main body
12 Central opening
14 Guide blades
15 Fastening flange
15A Fastening means
16 Contact surface
17 Bores
20 Shaft
30 Turbine wheel
31 Rotor blades
40 Bearing space
41 Bearing housing
50 Turbine space
51 Turbine housing
60 Exhaust-gas turbocharger

The invention claimed is:

1. A nozzle ring for a radial turbine, the nozzle ring comprising:
   a rotationally symmetrical, disk-shaped main body with a central opening for receiving a shaft, wherein the main body is configured to form a heat shield between a bearing space of a bearing housing and a turbine space, with one or more recesses in a bearing housing side of the main body forming one or more air-filled insulation spaces, when the nozzle ring is installed;
   guide blades integrally formed with the main body and free floating at one end forming a single piece structure, wherein the guide blades are arranged circumferentially in a radially outer region of the main body and each extend from the main body in an axial direction, and wherein the guide blades are configured to direct exhaust gases onto rotor blades of a turbine wheel; and
   a fastening flange arranged in a radially inner region of the main body, wherein the fastening flange has a contact surface configured for support on a corresponding contact surface of the bearing housing; wherein the fastening flange comprises one or more bores arranged circumferentially and configured to receive one or more fasteners in order to install the nozzle ring on the bearing housing.

2. The nozzle ring of claim 1, wherein the fastening flange is integrally formed with the main body.

3. The nozzle ring of claim 1, wherein the one or more recesses comprise ribs which extend in a radial direction.

4. The nozzle ring of claim 3, wherein the one or more bores are arranged in the fastening flange on a first virtual circular line with a first radius around the central opening, and wherein the guide blades are arranged on a second virtual circular line with a second radius around the central opening, wherein the second radius is at least 1.5 times larger than the first radius.

5. The nozzle ring of claim 3, wherein a plurality of bores are arranged in the fastening flange at regular angular intervals around the central opening.

6. The nozzle ring of claim 1, wherein the nozzle ring is configured such that, when the nozzle ring is installed, heat causes the nozzle ring to become at least one of: axially clamped between the bearing housing and a turbine housing defining the turbine space, radially clamped in the bearing housing, and radially clamped in the turbine housing.

7. An exhaust-gas turbocharger comprising:
   a shaft mounted in a bearing housing;
   a turbine wheel with rotor blades arranged on the shaft;
   a turbine housing having an inflow channel for exhaust gases, the inflow channel being positioned in the turbine housing upstream of the turbine wheel; and
   a nozzle ring held axially between the bearing housing and the turbine housing, wherein the nozzle ring comprises:
   a rotationally symmetrical, disk-shaped main body with a central opening receiving the shaft, wherein the main body forms a heat shield between a bearing space of the bearing housing and a turbine space of the turbine housing, with one or more recesses in a bearing housing side of the main body forming one or more air-filled insulation spaces;
   guide blades integrally formed with the main body and free floating at one end forming a single piece structure, wherein the guide blades are arranged circumferen-tially in a radially outer region of the main body and each extend from the main body in an axial direction, and wherein the guide blades are configured to direct exhaust gases onto the rotor blades of the turbine wheel; and
   a fastening flange arranged in a radially inner region of the main body, wherein the fastening flange is fastened to the bearing housing by one or more fasteners.

8. The exhaust-gas turbocharger of claim 7, wherein the one or more fasteners are screws, the nozzle ring being screwed to the bearing housing.

9. The exhaust-gas turbocharger of claim 7, wherein the nozzle ring is axially braced in a manner of a plate spring between the bearing housing and the turbine housing.

10. The exhaust-gas turbocharger of claim 7, wherein one or more rotation prevention means are provided between the nozzle ring and at least one of the bearing housing or the turbine housing.

11. The exhaust-gas turbocharger of claim 7, wherein the nozzle ring is configured such that heat causes the nozzle ring to become at least one of: axially clamped between the bearing housing and the turbine housing, radially clamped in the bearing housing, and radially clamped in the turbine housing.

12. The exhaust-gas turbocharger of claim 7, wherein the fastening flange is integrally formed with the main body.

13. The exhaust-gas turbocharger of claim 7, wherein the fastening flange comprises one or more bores arranged circumferentially and configured to receive the one or more fasteners.

14. The exhaust-gas turbocharger of claim 13, wherein the one or more recesses comprise ribs which extend in a radial direction.

15. The exhaust-gas turbocharger of claim 13, wherein the one or more bores are arranged in the fastening flange on a first virtual circular line with a first radius around the central opening, and wherein the guide blades are arranged on a second virtual circular line with a second radius around the central opening, wherein the second radius is at least 1.5 times larger than the first radius.

16. The exhaust-gas turbocharger of claim 13, wherein the one or more bores are arranged in the fastening flange at regular angular intervals around the central opening.

17. The nozzle ring of claim 6, wherein the one or more recesses comprise ribs which extend in a radial direction.

* * * * *